(12) United States Patent
Prabhakar et al.

(10) Patent No.: US 9,065,795 B2
(45) Date of Patent: *Jun. 23, 2015

(54) APPARATUS AND METHOD FOR PROVIDING A CONGESTION MEASUREMENT IN A NETWORK

(71) Applicants: Balaji Prabhakar, Palo Alto, CA (US); Rong Pan, Sunnyvale, CA (US)

(72) Inventors: Balaji Prabhakar, Palo Alto, CA (US); Rong Pan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 13/848,592

(22) Filed: Mar. 21, 2013

(65) Prior Publication Data

US 2013/0227163 A1     Aug. 29, 2013

Related U.S. Application Data

(63) Continuation of application No. 11/924,274, filed on Oct. 25, 2007, now Pat. No. 8,407,364.

(51) Int. Cl.
*G06F 15/16* (2006.01)
*H04L 29/06* (2006.01)
*H04L 12/26* (2006.01)
*H04L 12/801* (2013.01)
*H04L 12/825* (2013.01)

(52) U.S. Cl.
CPC ............ *H04L 69/02* (2013.01); *H04L 43/0882* (2013.01); *H04L 43/16* (2013.01); *H04L 47/10* (2013.01); *H04L 47/11* (2013.01); *H04L 47/12* (2013.01); *H04L 47/25* (2013.01)

(58) Field of Classification Search
CPC ...... H04L 43/16; H04L 43/0882; H04L 69/02
USPC .................................. 709/232–235; 370/229
See application file for complete search history.

(56) References Cited

U.S. PATENT DOCUMENTS

| | | | |
|---|---|---|---|
| 6,075,769 A | 6/2000 | Ghanwani et al. | |
| 6,112,085 A * | 8/2000 | Garner et al. ................. | 455/428 |
| 6,115,356 A | 9/2000 | Kalkunte et al. | |
| 6,192,406 B1 | 2/2001 | Ma et al. | |
| 6,295,614 B1 | 9/2001 | Peters et al. | |
| 6,675,220 B1 | 1/2004 | Bergamasco et al. | |

(Continued)

FOREIGN PATENT DOCUMENTS

JP   2005102104 A2   4/2005

OTHER PUBLICATIONS

"U.S. Appl. No. 11/924,274, Final Office Action mailed Apr. 16, 2010", 18 pgs.

(Continued)

*Primary Examiner* — Thu Ha Nguyen (57) ABSTRACT

Example embodiments of a system and method for providing a congestion measurement in a network are disclosed. In an example embodiment information is received at an information transfer rate, from a source network device. A sample of the information may be taken before the information is transmitted to a destination network device. In an example embodiment, a congestion measurement value is computed that corresponds to the sample and represented with at least two bits. A multi-bit indicator of the congestion measurement value is then transmitted to control the information transfer rate of information arriving in the future.

24 Claims, 7 Drawing Sheets

(56) References Cited

U.S. PATENT DOCUMENTS

| | | |
|---|---|---|
| 6,826,620 B1 | 11/2004 | Mawhinney et al. |
| 6,910,079 B2 | 6/2005 | Zimmermann et al. |
| 7,002,980 B1 | 2/2006 | Brewer et al. |
| 7,161,907 B2 | 1/2007 | Mott |
| 7,185,103 B1 | 2/2007 | Jain |
| 7,225,267 B2 * | 5/2007 | Key et al. ............... 709/235 |
| 7,230,917 B1 | 6/2007 | Fedorkow et al. |
| 7,715,328 B2 | 5/2010 | Ambe et al. |
| 8,407,364 B2 | 3/2013 | Prabhakar et al. |
| 2002/0054595 A1 | 5/2002 | Ambe et al. |
| 2002/0194361 A1 | 12/2002 | Itoh et al. |
| 2003/0107994 A1 | 6/2003 | Jacobs et al. |
| 2003/0115355 A1 | 6/2003 | Cometto et al. |
| 2003/0163593 A1 | 8/2003 | Knightly |
| 2003/0221015 A1 | 11/2003 | Basso |
| 2004/0067758 A1 * | 4/2004 | Laiho ................. 455/456.1 |
| 2007/0147238 A1 | 6/2007 | Kadambi et al. |
| 2007/0280245 A1 | 12/2007 | Rosberg |
| 2008/0028467 A1 | 1/2008 | Kommareddy et al. |
| 2009/0113069 A1 | 4/2009 | Prabhakar et al. |
| 2011/0134925 A1 | 6/2011 | Safrai et al. |
| 2013/0021932 A1 * | 1/2013 | Damnjanovic et al. ....... 370/252 |
| 2013/0067992 A1 * | 3/2013 | Sinha et al. .................. 73/24.04 |

OTHER PUBLICATIONS

"U.S. Appl. No. 11/924,274, Non Final Office Action mailed Jun. 8, 2012", 5 pgs.

"U.S. Appl. No. 11/924,274, Non Final Office Action mailed Oct. 9, 2009", 16 pgs.

"U.S. Appl. No. 11/924,274, Notice of Allowance mailed Nov. 21, 2012", 6 pgs.

"U.S. Appl. No. 11/924,274, Response filed Jan. 8, 2010 to Non Final Office Action mailed Oct. 9, 2009", 16 pgs.

"Response filed Oct. 2, 2012 to Non-Final Office Action Mailed Jun. 8, 2012", 12 pgs.

Bergamasco, Davide, "Backward Congestion Notification Version 2.0", 802.1 Interim Meeting, (Sep. 22, 2005), 39 pgs.

Lu, Yi, et al., "Congestion Control in Networks with no Congestion Drops", www.ieee802.org, (Jan. 24, 2007), 8 pgs.

* cited by examiner

APPARATUS AND METHOD FOR PROVIDING A CONGESTION MEASUREMENT IN A NETWORK

RELATED APPLICATION

This application is a continuation of and claims the benefit of priority under 35 U.S.C. §120 to U.S. application Ser. No. 11/924,274, filed Oct. 25, 2007, now U.S. Pat. No. 8,407,364, issued Mar. 26, 2013, the entire contents of which is incorporated herein by reference.

FIELD

The present disclosure relates generally to network communication. Specifically, example embodiments of the invention relate to managing congestion in a network.

BACKGROUND

In a communication network, information is distributed amongst network nodes (e.g., information processing devices). In some networks, a source node may communicate with a destination node through an intermediate node. Measures of network performance are typically dependent on data transfer rates.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Overview

Example embodiments of a system and method for providing a congestion measurement in a network are disclosed. In an example embodiment information is received at an information transfer rate, from a source network device. A sample of the information may be taken before the information is transmitted to a destination network device. In an example embodiment, a congestion measurement value is computed that corresponds to the sample and represented with at least two bits. The congestion measurement value may be associated with an available bandwidth. A multi-bit indicator of the congestion measurement value is then transmitted to control the information transfer rate of information arriving in the future.

Example Embodiments

A method and apparatus for providing a congestion measurement in a network are disclosed. In the following description, for purposes of explanation, numerous specific details are set forth to provide a thorough understanding of the present invention. It will be apparent, however, to one skilled in the art that the present invention can be practiced without these specific details.

In general, a method and apparatus are described for providing a congestion measurement in a network. In example embodiments, a source network device (e.g., a server computer) communicates with a destination network device (e.g., an end-user computer) through an intermediate network device (e.g., a switch). Thus, in an example embodiment the intermediate network device (e.g., the switch), inter alia, receives frames at a frame transfer rate from the source network device and forwards the frames to the destination network device. As used herein, an intermediate network device such as a swatch may include any forwarding device implemented in hardware, software, or a combination of hardware and software. Accordingly, a switch may be used to forward frames (e.g., from a source network device to a destination network device) based on information embedded within the frames (e.g., a layer 2 MAC address, a layer 3 network address, a layer 3 service quality parameter, a layer 3 application and/or layer 4 application, or other embedded information, etc.).

In example embodiments, the intermediate network device is a switch and logic within the switch samples some of the frames and computes a "congestion measurement value" that corresponds to a representative sample. A "congestion measurement value" may include a numerical value that represents a measurement of impedance to the flow of frames through the switch (and, e.g., in the network). The congestion measurement value may be used to determine available bandwidth.

In example embodiments, logic within the switch represents the congestion measurement value in binary with at least two bits. A multi-bit indicator of the congestion measurement value is transmitted from the switch (e.g., to the source network device, server computer, or other network device, etc.). In example embodiments, the multi-bit indicator is a representation of the congestion measurement value composed of a fewer number of bits than the congestion measurement value or an equal number of bits as the congestion measurement value. In example embodiments, the switch transmits the multi-bit indicator of the congestion measurement value to control the frame transfer rate at which the switch receives frames from the source network device.

In the following detailed description of the example embodiments, reference is made to the accompanying drawings that show, by way of illustration, example embodiments in which the invention may be practiced. In the drawings, like numerals describe substantially similar components throughout the several views. These embodiments are described in sufficient detail to enable those skilled in the art to practice the invention. Other example embodiments may be used and structural, logical, and electrical changes may be made without departing from the scope of the present invention. Moreover, it is to be understood that the various embodiments of the invention, although different, are not necessarily mutually exclusive. For example, a particular feature, structure, or characteristic described in an embodiment may be included within other example embodiments. The following detailed description is, therefore, not to be taken in a limiting sense, and the scope of the present invention is defined only by the appended claims, along with the full scope of equivalents to which such claims are entitled.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout this description, discussions using terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission, or display devices.

Figure 1:
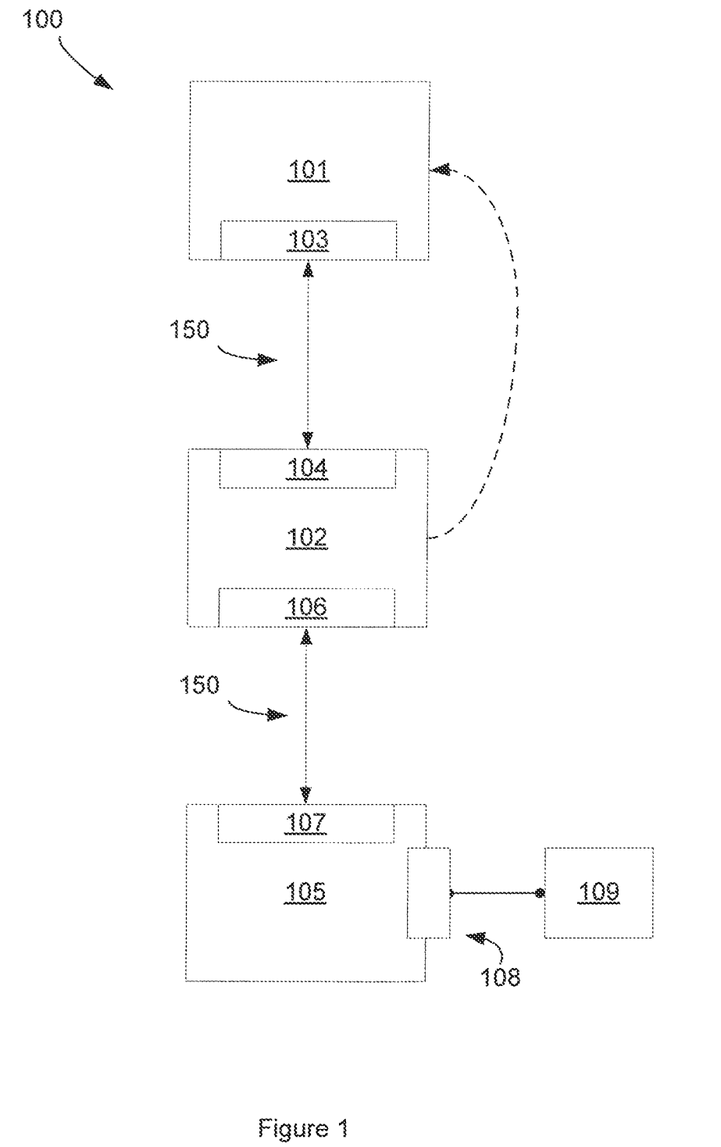
FIG. 1 is a block diagram illustrating a network system in accordance with example embodiments.

FIG. 1 is a block diagram illustrating a network system 100 in accordance with example embodiments. The system 100 is shown to include information processing devices 101 and 105 having input-output (I/O) ports 103 and 107 and 108. The I/O ports, 103 and 107 may be used to communicatively couple the information processing devices 101 and 105 to the transmission medium 150. The system 100 includes an information processing device 102 that includes I/O ports 104 and 106 that may be used to couple the information processing device 102 to the transmission medium 150. An information processing device 109 may be coupled to the information processing device 105 via I/O port 108 and the transmission medium 150 via an I/O port (not shown) or other commercially available connective means. In an example embodiment, the information processing devices 101, 102, 105, and 109 are communicatively coupled to one another when each are simultaneously coupled with the transmission medium 150.

The information processing devices 101, 102, 105, and 109 may each be any electronic device that processes information according to a list of instructions or that includes hardware to implement logic. In an example embodiment, the information processing devices 101 and 105 are computers that include a central processing unit (CPU) to manipulate information. The information processing devices 102 and 109 may be network devices (e.g., switches that operate on Ethernet layer 2 frames, routers that operate on layer 3 Internet Protocol (IP) headers, or any other network devices, etc.). In an example embodiment, the information processing devices 101 and 105 are virtual machines, instantiated on a single hardware device and each having a separate channel of communication with one or more transmission media. The information processing devices 101, 105 may appear to be different sources/destinations to the network devices defined by the information processing devices 102, 109

The information processing devices 101, 102, 105, and 109 (hereinafter referred to as network devices) may communicate with other devices coupled with the transmission medium 150 using multiple communication protocols. In an example embodiment, one or more of the network devices 101, 102, 105, and 109 communicates using a protocol not used by the other network devices. For example, the network devices 101, 105 may communicate over the transmission medium 150 using 10 gigabit Ethernet while network device 109 communicates over transmission medium 150 using Internet SCSI (iSCSI) and Fibre Channel (FC). In example embodiments, network devices 101, 102, 105, and 109 use any protocols that can be communicated over an Ethernet network.

The transmission medium 150 may include any medium suitable for carrying information between the network devices 101, 102, 105, and 109. In an example embodiment, transmission medium 150 is a twisted pair cable to carry Ethernet communications. Other example embodiments may include combinations of transmission mediums that have various physical forms and collectively form an overall physical transmission medium (e.g. a combination of optical fiber, wireless, and twisted pairs coupled by routers, switches and/or other network devices, etc.).

The I/O ports 103, 104, 106, and 107 may provide an interface (e.g., network adaptors) between a device (e.g. network device 101, 102) and the transmission medium 150 and enable the device to receive and/or transmit information from and/or to the transmission medium 150. In an example embodiment, I/O ports 103, 104, 106, and 107 are physical I/O ports that physically couple with the transmission medium 150 (e.g. via RJ 45 connector and cable) through a port (e.g. a port configured to receive an RJ45 connector). The input output ports 103, 104, 106, and 107 may be configured to accommodate the use of multiple protocols communicated over transmission medium 150.

Figure 2:
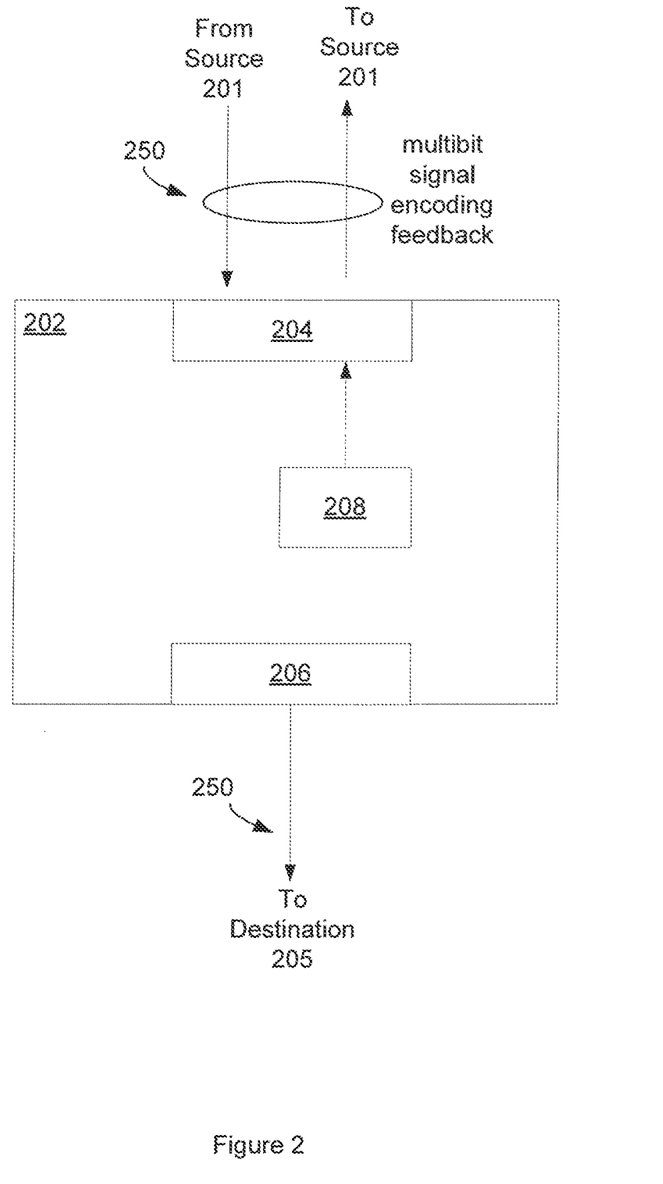
FIG. 2 is a block diagram illustrating a network device in accordance with example embodiments.

FIG. 2 is a block diagram illustrating a network device 202 in accordance with example embodiments.

The network device 202 is shown to include I/O ports 204, 206 and a congestion management module 208. The network device 202 may receive information from a source network device 201 and forward the information to a destination network device 205 (e.g., an end-user computer). Thus, network device 202 may be an "intermediate device" with respect to source network device 201 and destination network device 205 because network device 202 is located along the communication path of the network devices 201, 205.

In FIG. 2, the I/O ports 204, 206, may be substantially similar to the I/O ports 104, 106 described with respect to FIG. 1. The congestion management module 208 may provide a "congestion measurement value" that represents a measurement of congestion at the location of the network device 202 at a time or within a range of times. A congestion measurement value may be a quantification of impedance (e.g., a degree of blockage or obstruction, etc.) to the flow of information (e.g., network traffic) between a source and a destination network device (e.g., source and destination processing devices 201, 205), through the network device 202. In an example embodiment, the congestion measurement value is represented in binary with two or more bits.

The congestion management module 208 may measure and make known the congestion at the location of the network device 202. As used herein congestion measurements may describe impedance to flow and may be used to determine whether relatively high or low levels of congestion exists. Relatively low levels of congestion may correspond with a relatively high level of available bandwidth. For example, the congestion management module 208 may represent the congestion measurement value in binary with multiple bits and cause the transmission of a multi-bit congestion indicator from the network device 202 to a network node (e.g., the source network device 201). In an example embodiment, the multi-bit indicator is based on the congestion measurement value and the source network device 201 may adjust the timing of its future transmissions to the network device 202, based on the multi-bit indicator of the congestion measurement value.

In example embodiments, threshold congestion value(s) are established for the network device 202. It will be appreciated that a threshold congestion value may be chosen and/or adjusted to improve network and/or device performance, to decrease power consumption, or to influence other system efficiency related condition(s), etc. In an example embodiment, the congestion management module 208 measures (e.g., computes) congestion at the network device 202 and compares the congestion measurement value to a threshold congestion value. The congestion management module 208 may manage congestion within the network device 202, based on the difference or lack of a difference between the congestion measurement value and a congestion threshold value.

Logic processed by the congestion management module 208 may be implemented in hardware (e.g., circuitry and memory components), software, or a combination of hardware and software.

Thus, in an example embodiment, the network device 202 includes I/O port(s) 204 and 206 to communicatively couple with the transmission medium 250. As such, the network device 202 may be an intermediate device 202 as it is communicatively coupled between other network devices (e.g., the network processing devices 201 and 205) via the transmission medium 250. In an example embodiment, the intermediate network device 202 includes a congestion management module 208 to compute a congestion measurement value represented by at least two bits (e.g., using 32 bits to describe the congestion measurement). Once the congestion management module 208 has determined the congestion measurement value, the network device 202 may cause a multi-bit indicator of the congestion measurement value to be transmitted to the transmission medium 250 via the I/O ports 204 or 206. The network device 202 may, for example, transmit the multi-bit indicator to the network device 201 to control the information transfer rate at the I/O port 204 of the network device 202. In an example embodiment, the network device 202 transmits the multi-bit indicator of the congestion measurement value only if it detects that a threshold congestion measurement value has been reached.

Figure 3:
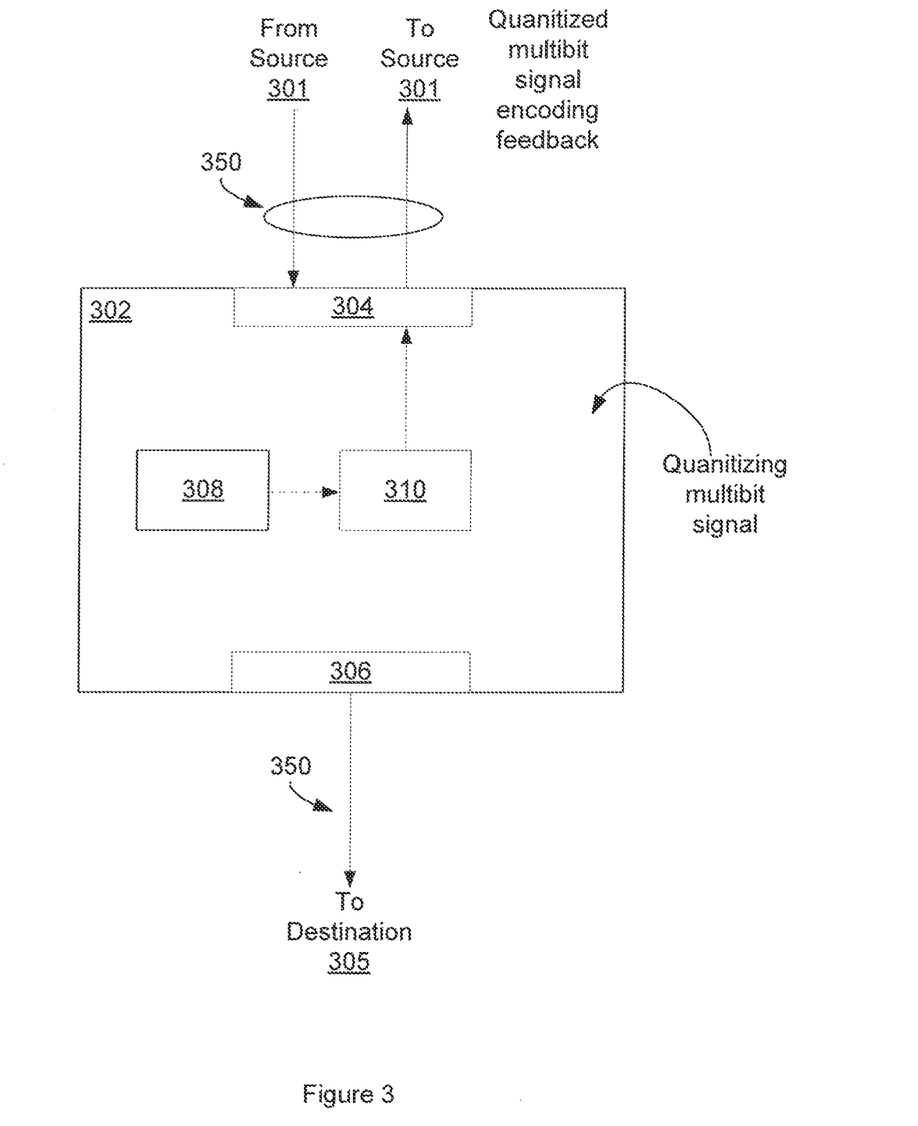
FIG. 3 illustrates a block diagram illustrating a network device in accordance with an example embodiments.

FIG. 3 is a block diagram illustrating a network device 302 in accordance with example embodiments. The device 302 is shown to include I/O ports 304, 306, a congestion management module 308, and a transmission medium 350 that may be substantially similar to those described with reference to FIG. 2. The information processing device 302 may additionally include a reduction module 310 to receive the congestion measurement value from the congestion management module 308, reduce the amount of information used to represent the value, and forward a multi-bit indicator of the value to the I/O port 304, to be transmitted onto the transmission medium 350. In an example embodiment, the reduction module 310 may quantize the congestion measurement value. Thus, a value expressed with a relatively greater number of bits may be quantized to represent the value with a relatively fewer number of bits. It is however to be appreciated that any quantization technique may be used to perform bit reduction tasks. Example embodiments may include other techniques for representing a value with a reduced number of bits.

Thus, the reduction module 310 may represent the congestion measurement value with multiple bits. At the same time, the multi-bit indicator may be represented with a fewer number of bits than the congestion management module 308 used to represent the congestion measurement value. In an example embodiment, the multi-bit indicator of the congestion measurement value is then transmitted to the transmission medium 350 by the network device 302 via the I/O port 304.

The multi-bit indicator of the congestion measurement value may be used to regulate the rate at which information is received by an intermediate network device (e.g., the network device 302) at its input output port(s) (e.g., I/O port 304). In an example embodiment, the multi-bit indicator indicates that a source network device (e.g., the network device 301) should send information to the intermediate network device 302 at a particular frequency. The particular frequency may correspond to the value represented by, or derived from, the multi-bit indicator. Thus, a first multi-bit indicator value may correspond to a first frequency while a second multi-bit indicator value corresponds to a second frequency, and so on, etc.

Figure 4:
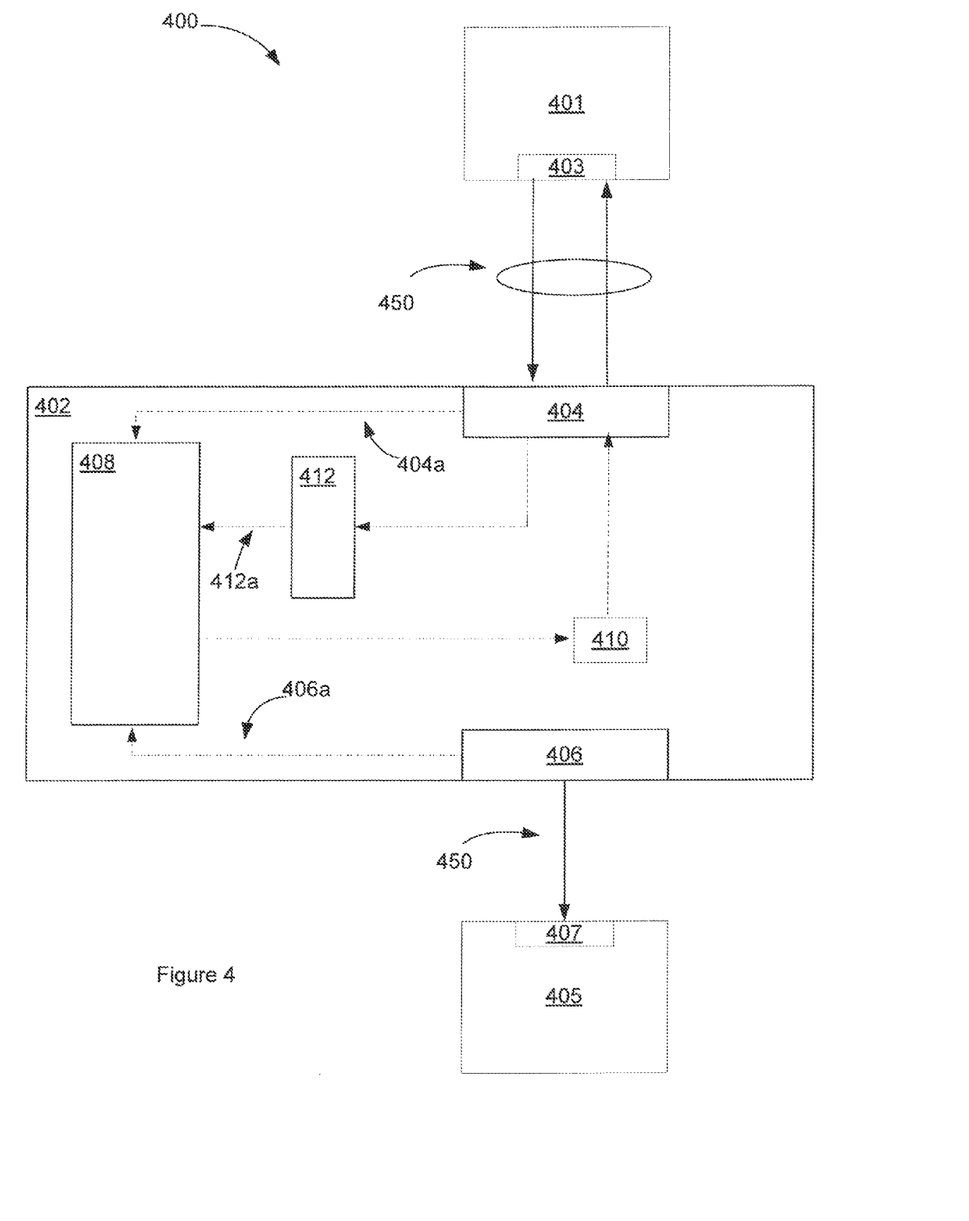
FIG. 4 is a block diagram illustrating a network system in accordance with example embodiments.

FIG. 4 is a block diagram illustrating a network system 400 in accordance with example embodiments. Source and destination network devices 401, 405, and I/O ports 403, 404, 406, and 407 may be substantially similar to the network devices 101, 105 and I/O ports 103, 104, 106, and 107 shown in FIG. 1. The reduction module 410 may be substantially similar to the reduction module 310 described with reference to FIG. 3. The information processing system 402 is also shown to include a congestion management module 408 to compute congestion measurement values measured within the network device 402.

In an example embodiment, the network device 402 includes an information buffer 412 to receive information units (e.g., Ethernet frames) from the I/O port 404 and store the information units until they are transmitted to the transmission medium 450 (e.g., via the I/O port 406) or otherwise disposed with, for example, frames may be dropped when the buffer occupancy exceeds a pre-defined threshold or when the buffer overflows due to an excess of frame arrivals. The information buffer 412 may be hardware and may include software to temporarily hold input and/or output data in memory. The information buffer 412 may be used to influence receive and transmit frequencies when the information units (e.g., Ethernet frames) are received and transmitted by the network device 402 at different or variable rates.

In an example embodiment, the congestion management module 408 samples information units (e.g., Ethernet frames) such that information units are randomly selected and have an equal, known, non-zero probability of being selected.

At the time a sample has been selected (or e.g., at a fixed period of time after the sample is selected), the congestion management module 408 may receive descriptive information (e.g., as shown by lines 404a, 412a and 406a) describing (e.g., characterizing) the flow of information units (e.g., as represented by the sample) within the network device 402.

The congestion management module 408 may compute a congestion measurement value using the descriptive information it has received. In an example embodiment, the information describing the flow of information units within the network device 402 includes rates at which information units enter into and exit from the information buffer 412, and the current occupancy of the information buffer 412 (e.g., a measure of the extent that the information buffer is filled with or consumed by information units).

In an example embodiment, the congestion management module 408 computes the congestion measurement value according to:

$$Fb = -[q_{off} + wq_{delta}]$$

where
Fb is the congestion measurement value computed at a time;
q is the information buffer occupancy at a time;
$q_{delta}$ is the rate of change of the flow of information units in the buffer;
w is a factor assigning a relative weight to $q_{delta}$; and $$q_{off} = q - q_{eq}$$

where
$q_{eq}$ represents a desired buffer queue occupancy.

In an example embodiment, the period of time is equal to the time between the congestion management module 408's sampling of information units (e.g., packets, frames, other units of information, etc.) It is to be appreciated that Fb provides linear feedback when its equation is additive and not multiplicative. Linear feedback to control reception rate may result in a stable response in a feedback control system.

Thus, in an example embodiment, the congestion management module 408 computes the congestion measurement value based on both the occupancy of the information buffer 412 (e.g., "q" the extent that a buffer queue is consumed with frames) and a measure of the degree that the information buffer impedes the flow of information across the transmission medium 450 (e.g., $q_{delta}$, the link utilization).

Through the example embodiment disclosed herein, the congestion measurement value, Fb, computed on the intermediate network device 402 may be used to provide feedback to a network node (e.g., the network device 401) resulting in stable information transfer rate responses. A source receiving a congestion message such as Fb may increase or decrease its transmission rate based on Fb.

In an example embodiment, the congestion management module 408 determines the congestion at the network device 402 (e.g., as described above) and represents the congestion measurement value with thirty-two bits. When the reduction module 410 receives the thirty-two bit congestion measurement value, the reduction module may quantize the congestion measurement value so that the congestion measurement value is represented with a fewer number of bits but remains to be multiple bits of sufficient resolution for its use to control the level of congestion (e.g., four bits). In an example embodiment, a binary description of the congestion measurement having 232 possible values is transformed into a binary description of the congestion measurement having a lower number of values, e.g., $2^4$ values. The example four bit congestion measurement value may thus be an indicator of the thirty-two bit congestion measurement value and is transmitted by the I/O port 404 via the transmission medium 450 and to the source network device 401.

Figure 5:
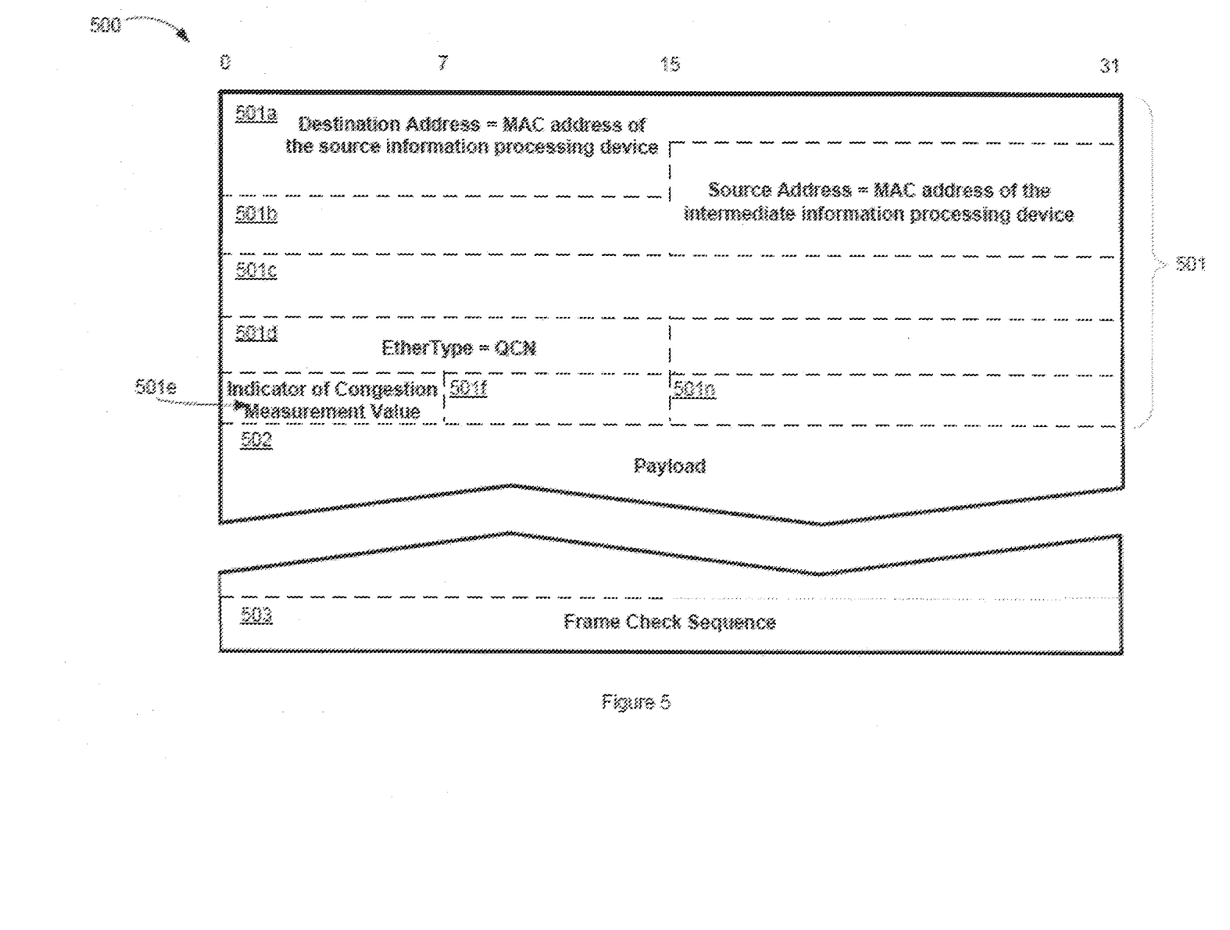
FIG. 5 is a block diagram illustrating an information unit in accordance with example embodiments.

FIG. 5 is a block diagram illustrating an information unit 500 (e.g., a frame), in accordance with example embodiments. In FIG. 5, the information unit 500 includes an information unit header 501 and shows fields 501a-501n, which in the example embodiment include information about the information unit 500. The information unit 500 may convey a message from the intermediate network device 402 to the source network device 401.

Prior to transmission, a network device sending the information unit 500 may append information (e.g., the destination, source, multi-bit indicator of the congestion measurement, payload, and/or other information, etc.) to the fields of the information unit header 501 to provide the information to a recipient of the information unit 500.

In an example embodiment, the information unit 500 is an Ethernet frame (e.g., a frame in accordance with standards defined by the Institute of Electrical and Electronics Engineers (IEEE) in the IEEE 802.3 protocol). The Ethernet frame 500 may be 32 bits wide and each of the header fields 501a-501n may include a number of bits that are available to encode information. The destination address field 501a may include 48 bits to encode the media access control (MAC) address of the network node to which the frame is to be sent; the source address field may include 48 bits to encode the MAC address of the network node that is the source of the frame; the EtherType field 501d may include 16 bits to encode the type of Ethernet frame being sent (e.g., a quantized congestion notification (QCN) frame); and the indicator field 501e may include 7 bits to encode the multi-bit indicator of the congestion measurement value.

It is to be appreciated that the Ethernet frame 500 may include fields specified by the IEEE 802.3 protocol in "The Ethernet, Physical and Data Link Layer Specifications, Version 2.0". Digital Equipment Corporation, Intel Corporation, and Xerox Corporation, 1982. It is to be understood that the Ethernet protocol is used by way of example and not by way of limitation. In example embodiments, other multi-bit protocol information units may indicate the congestion measurement value to control the rate at which information is received by the network device 402.

Returning to FIG. 4, the information units (e.g., frames) arriving at the intermediate network device 402 (e.g., a switch) from the source network device 401 (e.g., a network device such as a server computer) may be sampled according to a sampling probability. In response thereto, the congestion management module 408 may compute the congestion measurement value at the network device 402. The congestion management module 408 may then attach a multi-bit indicator of the congestion measurement value (e.g. a multi-bit congestion indicator) to a message frame (e.g., the frame 500). The congestion indicator may then be quantized and the message frame may then transmit the quantized congestion indicator to the source network device 401 (e.g. the server computer). The source network device 401 may then use the quantized congestion indicator to control its transmission rate.

In an example embodiment, the congestion management module 408 may send the message frame 500 to control the transmission rate of the network device 401 only if a threshold congestion value has been reached. The congestion management module 408 may determine that the threshold level is detected if the message frame 500 carrying the computed multi-bit congestion indicator (e.g., see Fb above) would cause the transmission rate into the switch (e.g., the intermediate network device 402) to decrease. In an embodiment, transmission rates decrease with Fb values that become more negative. When the threshold congestion measurement has been reached, the congestion management module 408 may encode the multi-bit congestion indicator within the multi-bit congestion indicator field 501e and cause the message frame to be transmitted to the network device 401. As mentioned above, upon receipt of the message frame, the network device 401 may use the multi-bit congestion indicator to determine the transmission rate that the network device 402 requires or at which it prefers to receive information.

In an example embodiment using congestion indicators that are associated with a rate decrease, as opposed to a rate increase, may result in a relatively fewer number of signals sent from the congestion point (e.g., network device 402) to manage congestion. In an example embodiment, by sending a congestion indicator associated with a decrease in transfer rate, signaling may be made to depend on whether there has been an increase in congestion at the node (e.g., because Fb has necessarily become more negative). As such, signaling does not depend solely on the buffer occupancy within the switch. Signaling may be dependent on congestion and not only network traffic. Further, sending rate increase signals that may increase already congested network nodes can be avoided.

In an example embodiment, the quantized congestion measurement value (e.g., the multi-bit congestion indicator or e.g., the multi-bit indicator of the congestion measurement value) is represented with evenly spaced bits (e.g., in the frame header 501 field 501e) and may be referred to as a uniform multi-bit indicator. Alternatively or additionally, in an example embodiment, the quantized congestion measurement value is represented with unevenly spaced bits and may be referred to as a non-uniform multi-bit indicator.

Through the use of the example embodiments of uniform and non-uniform congestion indicators to provide congestion signaling, a relatively greater number of levels of control signals may be used. Thus, control signals may be used to solicit a greater number of information transfer rates. Example embodiments may provide non-uniform decreases (and/or e.g., increases) between changes in transmission rates.

Thus, in an example embodiment, the multi-bit indicator of the congestion measurement value may be in the form of bits uniformly spaced over a frame header field and/or bits that are not uniformly spaced over a frame header field.

Referring again to FIGS. 4 and 5, in an example embodiment, the quantized congestion measurement value is a multi-bit congestion indicator within field 501e and may be used to adjust the rate at which information is to be transmitted to the intermediate network device 402 (herein after the switch 402). In an example embodiment, the source network device 401 receives the message frame transmitted by the switch 402 and reads the multi-bit congestion indicator encoded within the frame header 501, field 501e. In an embodiment, the source network device 401 uses the multi-bit congestion indicator as an index to look up in a data structure (e.g., a table stored in memory located on the source network device), a corresponding rate at which the source network device 401 is to transmit information to the switch 402. In an example embodiment, the decreased rate is provided until a timer (not shown) corresponding to the decreased rate has expired.

In an example embodiment, once the timer corresponding to the decreased rate has expired, the source network device 401 provides for multiplicative rate increases until another decrease signal is received from the switch 402. In an example embodiment, the current transmission rate Rc increases according to $R_C \times A$, for A>1 for a time T. In an example embodiment, A is the increase parameter and T is the increase interval. In an example embodiment, When $R_{C(1)}$ =$R_{C(0)} \times 3$, the source network device 401 transmits at a rate $R_{C(1)}$ until T has elapsed. Once T has elapsed and provided that a decrease signal (e.g., Fb) has not been received, the source network device 401 may then transmit at a rate $R_{C(2)}$ =$R_{C1} \times 3$ for a time T, and so on, etc. If and when the source network device 402 receives an Fb signal from the switch 402, the source network device 401 may stop increasing its transmission rate multiplicatively and decrease a transfer rate in accordance with Fb.

Figure 6:
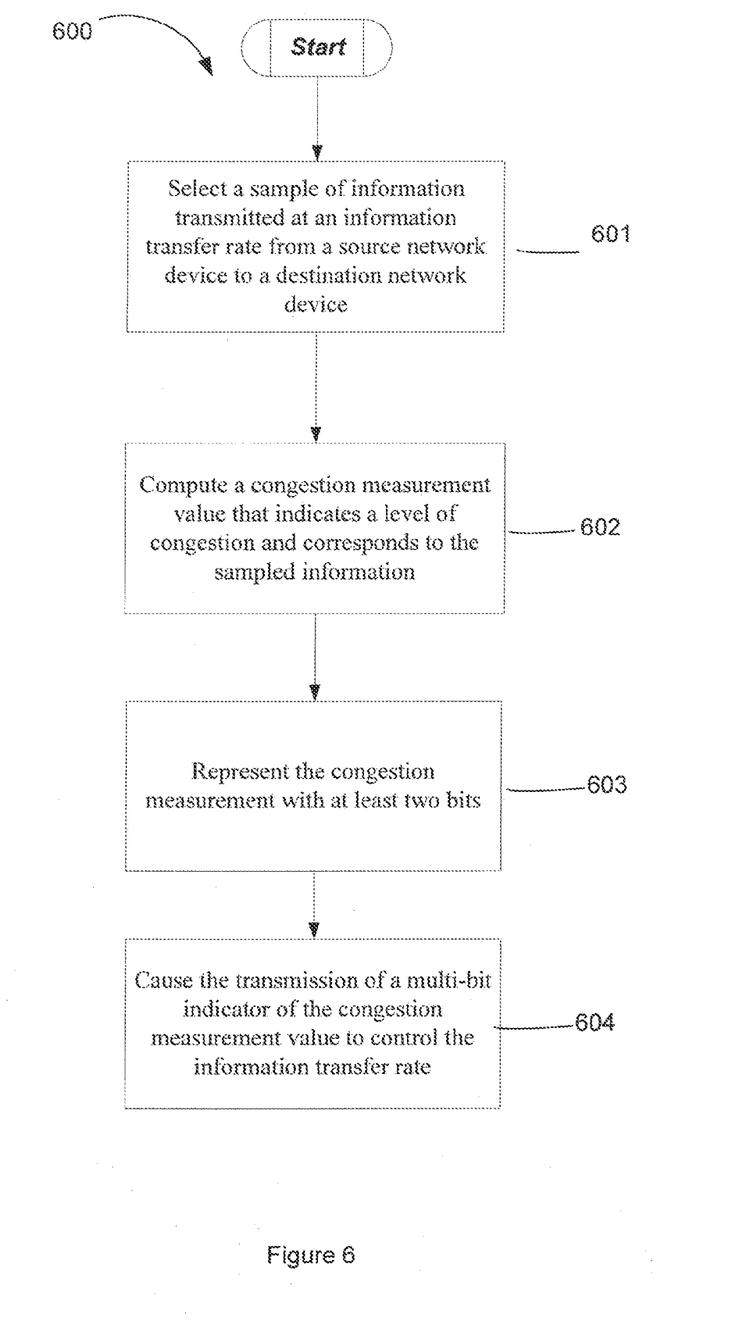
FIG. 6 shows a flow diagram of a method in accordance with example embodiments.

FIG. 6 shows a flow diagram of a method in accordance with example embodiments for controlling congestion in a network. In example embodiments, the processing logic is implemented, at least in part, with the congestion management module referred to herein. In FIG. 6, the process 600 starts with the processing logic selecting a sample of information as it is received from a source network device (e.g., one out of multiple arriving frames may be selected with a sampling probability, p). In an example embodiment, the information is received at an information transfer rate and is to be transmitted to a destination network device (e.g., an end-user computer) (see processing block 601).

The sequence continues at processing block 602 with the processing logic computing a congestion measurement value that indicates a level of congestion and corresponds to the sample of information. At processing block 603 the congestion measurement value is represented with at least two bits. In example embodiments, various data is collected at the time a frame is sampled and is used to compute the congestion measurement (e.g., a measurement of the congestion at the time of sampling or at an offset from the time of sampling).

The sequence concludes at processing block 604 with processing logic causing the transmission of a multi-bit indicator of the congestion measurement value to control the information transfer rate. In example embodiments, the multi-bit indicator is transmitted to a source network device that adjusts its transmission output in conformance with a transfer rate corresponding to the multi-bit indicator.

Other embodiments of the present invention can be accomplished by way of software. For example, in some embodiments, the present invention may be provided as a computer program product or software that may include a machine or computer-readable medium having stored thereon instructions that may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

In an embodiment, the software used to facilitate the routine can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), etc.

Figure 7:
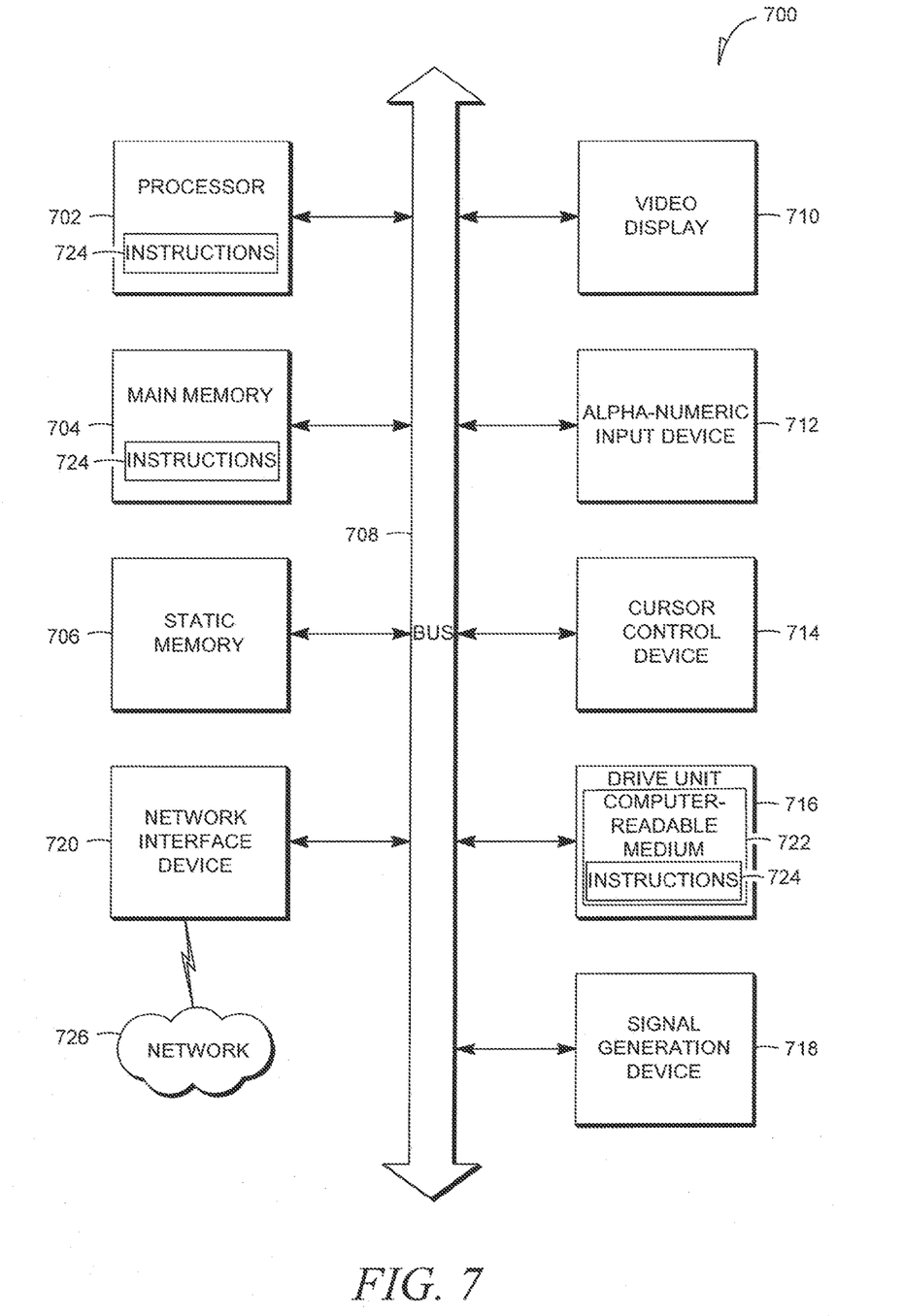
FIG. 7 is a block diagram illustrating a computer in accordance with example embodiments.

FIG. 7 shows a diagrammatic representation of machine in the example form of a computer system 700 within which a set of instructions, for causing the machine to perform any one or more of the methodologies discussed herein, may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 includes a machine-readable medium 722 on which is stored one or more sets of instructions and data structures (e.g., software 724) embodying or used by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 using any one of a number of well-known file transfer protocols (e.g., FTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention, or that is capable of storing, encoding, or carrying data structures used by or associated with such a set of instructions. The term "machine-readable medium" shall accordingly be taken to include, but not be limited to, solid-state memories, optical media and magnetic media.

Thus, example embodiments of a method and apparatus for managing congestion in a network have been described. The exemplary embodiments disclosed herein may provide a robust and stable congestion control technology that promotes fair and high throughput flows with low latency and loss. If is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
a source network device including at least one input-output port to communicatively couple with a sink network device via a transmission medium, the source network device including:
a transmission control module to regulate an information transfer rate, the transmission control module being configured to:
reduce the information transfer rate in response to receiving a multi-bit indicator, wherein the multi-bit indicator is generated from a congestion measurement value to reduce a number of bits used to represent the congestion measurement value, wherein the congestion measurement value represents a measurement of network congestion, and wherein the multi-bit indicator is composed of m bits, the congestion measurement value is composed of n bits, and n is greater than m, and
automatically increase the information transfer rate after a predefined period of time.

2. The apparatus of claim 1, wherein the automatic increase is performed only if the multi-bit indicator fails to be received during a preceding predefined period of time.

3. The apparatus of claim 1, wherein the automatic increase is performed periodically until another multi-bit indicator is received.

4. The apparatus of claim 1, wherein the automatic increase is substantially equal to a current information transfer rate multiplied by a multiplication factor.

5. The apparatus of claim 1, wherein reception of the multi-bit indicator indicates that a network device detected that the congestion measurement value transgressed a predefined threshold.

6. The apparatus of claim 1, wherein the information transfer rate is based on a value of the multi-bit indicator.

7. The apparatus of claim 1, wherein the multi-bit indicator is represented with a number of bits in a range of two to thirty-one bits and the congestion measurement value comprises at least thirty-two bits.

8. The apparatus of claim 1, wherein the multi-bit indicator is at least one of bits uniformly spaced within a field of a frame header, and bits not uniformly spaced within the field.

9. The apparatus of claim 1, wherein the congestion measurement value is based on a time of a sample of information received by a network device, an extent that an information buffer in the network device is consumed by information units, and a difference between a first rate that the information buffer is enqueued with the information and a second rate that the information buffer is dequeued of the information.

10. A method comprising;
generating a multi-bit indicator composed of m bits from a congestion measurement value to reduce a number of bits used to represent the congestion measurement value, wherein the congestion measurement value represents a measurement of network congestion and is composed of n bits, and wherein n is greater than m;
regulating an information transfer rate by reducing the information transfer rate in response to receiving a multi-bit indicator and by automatically increasing the information transfer rate after a predefined period of time.

11. The method of claim 10, wherein the automatic increase is performed only if the multi-bit indicator fails to be received during a preceding predefined period of time.

12. The method of claim 10, wherein the automatic increase is performed periodically until another multi-bit indicator is received.

13. The method of claim 10, wherein the automatic increase is substantially equal to a current information transfer rate multiplied by a multiplication factor.

14. The method of claim 10, wherein reception of the multi-bit indicator indicates that a network device detected that the congestion measurement value transgressed a predefined threshold.

15. The method of claim 10, wherein the information transfer rate is based on a value of the multi-bit indicator.

16. The method of claim 10, wherein the multi-bit indicator is represented with a number of bits in a range of two to thirty-one bits and the congestion measurement value comprises at least thirty-two bits.

17. The method of claim 10, wherein the multi-bit indicator is at least one of bits uniformly spaced within a field of a frame header, and bits not uniformly spaced within the field.

18. The method of claim 10, wherein the congestion measurement value is based on a time of a sample of information received by a network device, an extent that an information buffer in the network device is consumed by information units, and a difference between a first rate that the information buffer is enqueued with the information and a second rate that the information buffer is dequeued of the information.

19. A non-transitory machine-readable medium containing instructions which, when executed by a processing system, cause the processing system to perform a method, the method comprising:
generating a multi-bit indicator composed of m bits from a congestion measurement value to reduce a number of bits used to represent the congestion measurement value, wherein the congestion measurement value represents a measurement of network congestion and is composed of n bits, and wherein n is greater than m;
regulating an information transfer rate by reducing the information transfer rate in response to receiving a multi-bit indicator and by automatically increasing the information transfer rate after a predefined period of time.

20. The non-transitory machine-readable medium of claim 19, wherein the information transfer rate is based on a value of the multi-bit indicator.

21. The non-transitory machine-readable medium of claim 19, wherein the automatic increase is performed only if the multi-bit indicator fails to be received during a preceding predefined period of time.

22. The non-transitory machine-readable medium of claim 19, wherein the automatic increase is performed periodically until another multi-bit indicator is received.

23. The non-transitory machine-readable medium of claim 19, wherein the automatic increase is substantially equal to a current information transfer rate multiplied by a multiplication factor.

24. The non-transitory machine-readable medium of claim 19, wherein the congestion measurement value is based on a time of a sample of information received by a network device, an extent that an information buffer in the network device is consumed by information units, and a difference between a first rate that the information buffer is enqueued with the information and a second rate that the information buffer is dequeued of the information.

* * * * *